Feb. 5, 1963 C. L. JOHNSON 3,076,311
GAS TURBINE ENGINE FUEL SYSTEM
Filed June 30, 1960
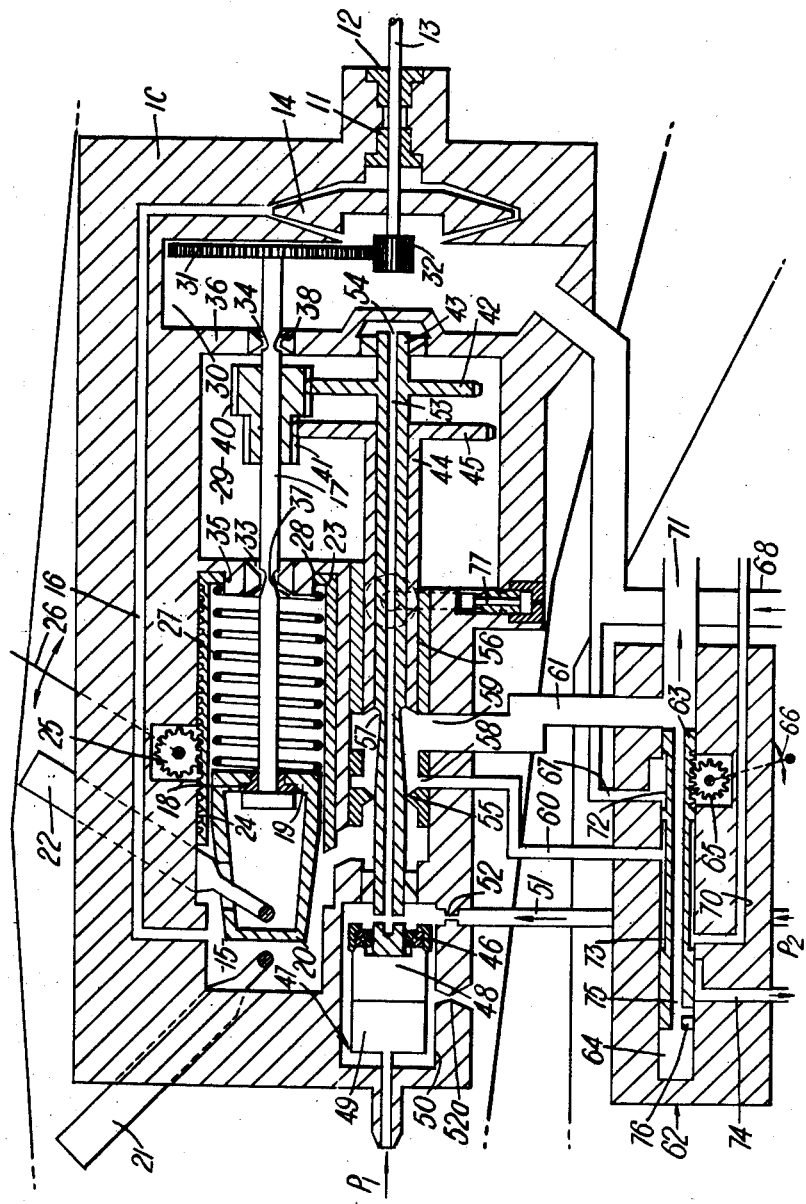
Inventor
Christopher Linley Johnson
By Fred E. Shoemaker
&
Fred L. Witherspoon, Jr. Attorney

United States Patent Office 3,076,311
Patented Feb. 5, 1963

3,076,311
GAS TURBINE ENGINE FUEL SYSTEM
Christopher Linley Johnson, Allestree, England, assignor to Rolls-Royce Limited, Derby, England, a company of Great Britain
Filed June 30, 1960, Ser. No. 39,850
Claims priority, application Great Britain July 3, 1959
8 Claims. (Cl. 60—39.28)

This invention, which is an improvment in or modification of the invention disclosed in the specification of the co-pending United States Patent application No. 822,580 filed June 24, 1959, concerns a gas turbine engine fuel system. Although it is not so restricted, the invention is especially well suited for use on jet lift and trainer engines.

According to one aspect of the present invention, there is provided a gas turbine engine fuel system comprising a throttle valve body having a port therein, a valve obturating member movable in said valve body so as to throttle fuel flow through said port, means for applying to one side of the obturating member a first fluid pressure which varies in accordance with the value of a first engine variable, and hydraulically actuated means for applying to the other side of the obturating member a second fluid pressure which varies in accordance with the value of a second engine variable, the position of the obturating member in the throttle valve body being controlled solely by the fluid forces acting on it.

Preferably the said second engine variable is engine rotational speed.

Thus the fuel system may comprise an engine driven fuel pump, a conduit connecting the delivery side of the pump to one side of the obturating member, pressure variation means for varying the fuel pressure of a downstream portion of the conduit in accordance with the value of the first engine variable, and a passage interconnecting the conduit, on the upstream side of said conduit portion, with the other side of the obturating member, the said hydraulically actuated means being controlled by the pressure developed by said pump and itself serving to vary the fuel pressure in said passage.

Preferably, the said hydraulically actuated means, which may be constituted by a rotatable shaft, is axially movable by the pressure developed by said pump and is disposed within said passage, the hydraulically actuated means and passage having corresponding portions which are so formed that axial movement of the hydraulically actuated means varies the effective cross sectional area of the passage which is open to fuel flow.

The said other side of the obturating member may be disposed within a chamber forming part of said passage, the chamber being connected by variable restrictions to supplies of fuel on the low and high pressure sides respectively of said pump, axial movement of the hydraulically actuated means serving to vary said restrictions so that the pressure in said chamber varies in accordance with the speed of the pump and hence with engine rotational speed.

According to another aspect of the present invention, there is provided a gas turbine engine fuel system comprising two valve members which are mounted concentrically within each other, one of said valve members being an obturating member which is axially movable within a throttle valve body so as to throttle fuel flow through a port therein and the other of said valve members being axially positionable in accordance with the value of a first engine variable and controlling the value of a fluid pressure which is applied to one side of the obturating member, and means for applying to the other side of the obturating member a second fluid pressure which varies in accordance with the value of a second engine variable, the axial position of the obturating member depending solely on the fluid forces acting on it.

Preferably the other said valve member is mounted concentrically within the obturating member and is movable in accordance with a pressure (e.g. the outlet pressure) prevailing in a compressor of the engine or in accordance with a pressure functionally related to said outlet pressure.

One of the valve members may be closely mounted within the other, means being provided for effecting relative rotation between the two valve members.

The invention is illustrated, merely by way of example, in the diagrammatic accompanying drawing which is an axial section through a gas turbine engine fuel system in accordance with the present invention.

The terms "left" and "right" as used in the description below refer to left and right as viewed in the accompanying drawing.

Referring to the drawing, a gas turbine engine fuel system comprising a housing 10 having carbon bearings 11, 12 within which is journalled an engine driven pump shaft 13. The shaft 13 carries the impeller of a centrifugal pump 14.

A chamber 15 communicates with the delivery, or high pressure, side of pump 14 by way of a conduit 16. Rotatably mounted within the chamber 15 is a valve shaft 17 whose left hand end is journalled in a carbon bearing 18 carried by a stirrup piece 19.

The stirrup piece 19 has an end wall 20 which is disposed between an adjustable acceleration control stop 21 and an adjustable deceleration control stop 22, the stops 21, 22 being constituted by set screws arranged at an angle of about 70° to the axis of the valve shaft 17. Such a disposition of the stops 21, 22 permits fine adjustment and helps to save space.

Slidably mounted within the chamber 15 is a sleeve 23 whose periphery is formed with a rack 24 engaged by a pinion 25. A pilot's lever 26 is provided to effect rotation of the pinion 25 and hence axial adjustment of the sleeve 23.

A spring 27, which is mounted within the sleeve 23 is interposed between the stirrup piece 19 and a flange 28 at the right hand end of the sleeve 23. The stirrup piece 19, and hence the valve shaft 17, will therefore be urged towards the left by the spring 27, the shaft 17 being urged towards the right by the high pressure fuel in the chamber 15. The pressure of the fuel in the chamber 15 will vary as the square of the speed of the pump 14. The axial position of the valve shaft 17 will therefore vary with the value of a first engine variable, namely engine rotational speed.

The valve shaft 17, which is mounted within the chamber 15, also extends in turn through a servo chamber 29 and a low pressure chamber 30, the chamber 30 communicating with the low pressure side of the pump 14. The right hand end of the valve shaft 17, which is disposed within the low pressure chamber 30, is provided with a gear 31 which meshes with a pinion 32 on the pump shaft 13.

The valve shaft 17 passes through orifices 33, 34 in the walls 35, 36 which are respectively disposed between the chambers 15, 29 and between the chambers 29, 30. The valve shaft 17 has portions 37, 38 whose diameter varies axially, the portions 37, 38 cooperating with the orifices 33, 34 so as to vary the effective size of these orifices. The arrangement is such that movement of the valve shaft 17 towards the right increases the effective size of the orifice 33 and reduces that of the orifice 34, while movement of the valve shaft 17 towards the left reduces the effective size of the orifice 33 and increases that of the orifice 34. Such variation of the orifices 33, 34 adjusts or modulates the pressure of the fuel in the servo chamber 29. Accordingly, since the axial position of the valve shaft 17 varies with engine rotational speed, the fuel pressure in the servo chamber 29 will also vary with engine rotational speed.

Mounted on that portion of the valve shaft 17 which extends through the servo chamber 29 is a compound gear consisting of a large gear 40 and a small gear 41. The large gear 40 meshes with a gear 42 carried by a shaft 43, the shaft 43 being closely mounted concentrically within a sleeve 44. The sleeve 44 has a gear 45 meshing with the small gear 41. The drive imparted to the valve shaft 17 from the pump shaft 13 will therefore be transmitted to the shaft 43 and sleeve 44 so as to effect relative rotation therebetween. Such relative rotation diminishes the risk of sticking between the shaft 43 and sleeve 44.

The shaft 43 is mounted within the inner race of a grease-packed ball bearing 46 whose outer race is connected to a capsule 47 for axial adjustment thereby. The capsule 47 is divided by a central wall into two compartments 48, 49, the compartment 48 being evacuated and the compartment 49 being supplied with air at a pressure $P_1$ (i.e. the inlet pressure of the compressor of the engine). The capsule 47 is mounted within a chamber 50 which communicates with a pipe 51 having restrictions 52 therein. The pipe 51 is supplied with air at a pressure $P_2$ (i.e. the outlet pressure of the compressor).

The chamber 50 communicates with the atmosphere by way of a passage having a venturi-shaped restriction 52a therein. The chamber 50 is therefore subject to the pressure between restrictions 52 and 52a.

As shown, air passing from restriction 52 to restriction 52a flows through the chamber 50. In order to avoid heating of the capsule 47 by this air flow however, it is preferable to arrange that the air does not flow through the chamber 50. This can readily be effected by making the chamber 50 a side chamber connected by a pipe or drilling to the space between restrictions 52 and 52a.

The shaft 43 has an axial duct 53 therethrough, the left hand end of the duct 53 being supplied with air from the chamber 50. The right hand end of the duct 53 communicates with a pressure balance chamber 54. Accordingly, the opposite ends of the shaft 43 will be pressure balanced, whereby the axial position of the shaft 43 will vary in sympathy with a desired function of the compressor pressures which function is controlled by the relative areas of restrictions 52 and 52a and the relative proportions of the parts 48, 49 of the capsule 47 which are evacuated and are open to $P_1$ respectively.

The shaft 43, which extends through a metering orifice 55 formed in a cylindrical valve body 56, is provided with axially extending grooves 57 whose depth increases towards the right. Movement of the shaft 43 towards the right thus reduces the effective area of the metering orifice 55 and movement of the shaft 43 towards the left increases the said effective area.

The left hand end of the valve body 56 is open to receive high pressure fuel from the chamber 15. This fuel will therefore be metered by the metering orifice 55, the fuel pressure immediately downstream of the orifice 55 being equal to the pressure in chamber 29 as explained below.

The valve body 56 is provided with ports 58, 59 with which communicate a pilot fuel line 60 and a main fuel line 61 respectively. The valve body 56 constitutes, in effect, part of a throttle valve having a valve obturating member constituted by the sleeve 44. The sleeve 44 is movable within the body 56 to throttle flow through the port 59 and it may be also be arranged, if desired, that the sleeve 44 can throttle flow through the port 58.

The fuel system shown in the drawing also incorporates a shut-off cock and dump valve 62. The valve 62 has a valve member 63 mounted in a bore 64, the valve member 63 being axially movable by a rack and pinion device 65 adjustable by a manually operable lever 66.

The lines 60, 61 communicate with the bore 64 and there also communicates with the bore 64 a branch 67 of a fuel inlet passage 68 through which fuel is supplied to the low pressure chamber 30.

In the open position of the valve member 63 shown in the drawing, fuel may flow from the lines 60, 61 to lines 70, 71 respectively and thence to the manifolds (not shown) of the pilot and main burners, respectively, of the engine.

The valve member 63 may however be moved to a closed position (not shown) in which the line 61 is cut off from the line 71 and is connected, by way of a reduced diameter portion 72 of the valve member 63, to the branch 67. In the said closed position, the line 60 is also cut off from the line 70 and is connected, by way of a reduced diameter portion 73 of the valve member 63, to the branch 67. In the closed position, moreover, the line 70 communicates with a dump line 74 by means of slots not shown, while the line 71 also communicates with the dump line 74 by way of an axial bore 75 through the valve member 63 and a radial port 76 leading into the bore 75. Thus in the closed position, the main and pilot manifolds are connected to the dump line 74 while the main and pilot fuel flows through the line 61, 60 are recirculated back to the low pressure side of the pump 14 via the branch 67, passage 68 and chamber 30.

It will be appreciated that the sleeve 44, which is not acted on by any spring or the like, will be positioned solely by the fluid forces acting upon it. The sleeve 44 will be urged to the right by the pressure of the fuel immediately downstream of the metering orifice 55 and will be urged to the left by the pressure of the fuel in the servo chamber 29. If these pressures are unequal, the sleeve 44 will move and in so doing will throttle or unthrottle the ports 58, 59. The sleeve 44 will thus balance in a position such that the pressure drop across the metering orifice 55 will be equal to the pressure drop across the orifice 33, and any pump pressure in excess of this pressure drop plus the pressure drop at the engine burners will be throttled away at the ports 58, 59.

When the engine is accelerating rapidly the end wall 20 of the stirrup piece 19 will be in contact with the acceleration control stop 21 and the orifices 33, 34 will remain of fixed size. The pressure drop across the orifice 33, and hence across the metering orifice 55, will therefore be a fixed percentage of the pressure rise produced by the pump 14; accordingly, the said pressure drop will be proportional to the square of the engine speed. The construction shown in the drawing will therefore operate in the same general manner as that described in previously mentioned co-pending application No. 822,580.

When the governed speed, selected by the pilot's setting of the lever 26, is approached, the valve shaft 17 will move towards the right so as to increase the effective area of the orifice 33 and reduce that of the orifice 34. The pressure in the servo chamber 29 will therefore rise and the sleeve 44 will be moved towards the left so as to reduce fuel flow through the ports 58, 59.

The sleeve 44 may be arranged to restrict flow through the port 59 only and not through the port 58. On small engines operating at low altitudes, however, the pilot burners may be relatively large and it may therefore be desirable to be able to restrict the flow to the pilot burners to some predetermined value. For this purpose, therefore, the fuel system may include a starting and flight idling stop 77 which is provided with ball bearings or bronze shoes (not shown) engageable with the gear 45. The idling stop 77 is adjustable axially of the sleeve 44 e.g. by means of a friction locked eccentric adjustment (not shown).

A stop (not shown) may also be provided for limiting movement of the capsule 47 so as to limit the maximum fuel/speed ratio and hence the maximum thrust.

The rotation of the valve shaft 17 should assist in preventing the orifices 33, 34 becoming blocked with dirt.

If desired, however, a filter concentric with the valve shaft 17 may be mounted immediately upstream of the orifice 33 and the filter itself may rotate, the flow therethrough being inwardly directed so that dirt is thrown off towards the outside.

Opposite ends of the shaft 43 are preferably mounted in lip seals (not shown). In order to ensure that the pressure on these lip seals is always small but in the same direction, bushes (not shown) acting as viscous restrictors are provided on the high fuel pressure side of the lip seals. The space between the lip seals and viscous restrictions is connected to pump inlet pressure through a small relief valve which maintains the fuel pressure on the lip seals above that in the chamber 50.

I claim:

1. In a gas turbine engine having a compressor and a centrifugal fuel pump, a fuel system comprising a throttle valve body having a port therein, an obturating member which is axially movable within the throttle valve body so as to throttle fuel flow from said pump through said port, a valve member, the valve member and the obturating member being mounted concentrically within each other, means for effecting axial positioning of the valve member in accordance with the value of a first engine variable determinable from the compressor, means controlled by said valve member for adjusting the value of a fuel fluid pressure upstream of said port and applied to one side of the obturating member, and means for applying to the other side of the obturating member a second fuel fluid pressure which varies in accordance with the value of a second engine variable determinable by pump output pressure, the axial position of the obturating member depending solely on the fluid forces acting on it.

2. A gas turbine engine fuel system as claimed in claim 1 in which the second engine variable is engine rotational speed.

3. A gas turbine engine fuel system as claimed in claim 1 in which said valve member is mounted concentrically within the obturating member and is movable in accordance with a pressure functionally related to a pressure prevailing in a compressor of the engine.

4. A gas turbine engine fuel system as claimed in claim 1 in which means are provided for effecting continuous relative rotation between the valve member and the obturating member.

5. A gas turbine engine fuel system comprising a throttle valve body having a port therein, an obturating member which is axially movable within the throttle valve body so as to throttle fuel flow through said port, a valve member, the valve member and the obturating member being mounted concentrically within each other, means for effecting axial positioning of the valve member in accordance with the value of a first engine variable, an engine driven fuel pump, a conduit connecting the delivery side of the pump to one side of the obturating member, axial movement of the valve member adjusting the fuel pressure of a downstream portion of the conduit, a passage interconnecting the conduit, on the upstream side of said conduit portion, with the other side of the obturating member, and means including hydraulically actuated means for modulating to the other side of the obturating member a second fluid pressure which varies in accordance with the value of a second engine variable, the said hydraulically actuated means being controlled by the pressure developed by said pump and itself serving to vary the fuel pressure in said passage, and the axial position of the obturating member depending solely on the fluid forces acting on it.

6. A gas turbine engine fuel system comprising a throttle valve body having a port therein, an obturating member which is axially movable within the throttle valve body so as to throttle fuel flow through said port, a valve member, the valve member and the obturating member being mounted concentrically within each other, means for effecting axial positioning of the valve member in accordance with the value of a first engine variable, an engine driven fuel pump, a conduit connecting the delivery side of the pump to one side of the obturating member, axial movement of the valve member adjusting the fuel pressure of a downstream portion of the conduit, a passage interconnecting the conduit, on the upstream side of said conduit portion, with the other side of the obturating member and means including axially movable hydraulically actuated means disposed within said passage, for modulating to the other side of the obturating member a second fluid pressure which varies in accordance with the value of a second engine variable, the said hydraulically actuated means being controlled by the pressure developed by said pump, and the hydraulically actuated means and passage having corresponding portions such that axial movement of the hydraulically actuated means varies the effective cross-sectional area of the passage which is open to fuel flow, and the axial position of the obturating member depending solely on the fluid forces acting on it.

7. A gas turbine engine fuel system as claimed in claim 6 in which the hydraulically actuated means comprises a rotatable shaft, means being provided for rotating said shaft.

8. A gas turbine engine fuel system as claimed in claim 6 in which the said other side of the obturating member is disposed within a chamber forming part of said passage, the chamber being connected by variable restrictions to supplies of fuel on the low and high pressure sides respectively of said pump, axial movement of the hydraulically actuated means serving to vary said restrictions so that the pressure in said chamber varies in accordance with the speed of the pump and hence with engine rotational speed.

References Cited in the file of this patent

UNITED STATES PATENTS

| 2,649,686 | Lawrence | Aug. 25, 1953 |
| 2,668,414 | Lee | Feb. 9, 1954 |
| 2,759,532 | Harris et al. | Aug. 21, 1956 |
| 2,856,754 | Torell | Oct. 21, 1958 |
| 2,986,126 | Werts | May 30, 1961 |

FOREIGN PATENTS

| 695,283 | Great Britain | Aug. 5, 1953 |
| 806,207 | Great Britain | Dec. 23, 1958 |